(12) United States Patent
Budagher et al.

(10) Patent No.: US 9,407,078 B2
(45) Date of Patent: Aug. 2, 2016

(54) ADAPTABLE CABLE HANGER INSERT

(71) Applicants: Michael R. Budagher, Dallas, TX (US); Brad Leigh, Albany, OR (US)

(72) Inventors: Michael R. Budagher, Dallas, TX (US); Brad Leigh, Albany, OR (US)

( * ) Notice: Subject to any disclaimer, the term of this patent is extended or adjusted under 35 U.S.C. 154(b) by 523 days.

(21) Appl. No.: 13/843,463

(22) Filed: Mar. 15, 2013

(65) Prior Publication Data

US 2014/0261836 A1  Sep. 18, 2014

(51) Int. Cl.
*F16L 3/00* (2006.01)
*H02G 3/32* (2006.01)

(52) U.S. Cl.
CPC ........................................ *H02G 3/32* (2013.01)

(58) Field of Classification Search
CPC ........................................................ H02G 3/32
USPC ........................................ 248/62, 73, 58, 55
See application file for complete search history.

(56) References Cited

U.S. PATENT DOCUMENTS

| | | | | |
|---|---|---|---|---|
| 3,366,356 A | * | 1/1968 | Fisher | 248/56 |
| 5,702,076 A | * | 12/1997 | Humber | 248/57 |
| 6,485,241 B1 | * | 11/2002 | Oxford | 411/339 |
| 6,554,233 B1 | * | 4/2003 | Ungerecht | 248/75 |
| 7,582,836 B2 | * | 9/2009 | Tapper | 174/650 |
| 7,793,893 B2 | * | 9/2010 | Opperthauser | 248/62 |
| 7,810,762 B2 | * | 10/2010 | Condon et al. | 248/74.1 |
| 7,861,983 B2 | * | 1/2011 | Lange et al. | 248/74.4 |
| 8,759,682 B2 | * | 6/2014 | Devouge | 174/135 |
| 8,833,014 B2 | * | 9/2014 | Beele | 52/220.8 |
| 2010/0140420 A1 | * | 6/2010 | Deichman | 248/58 |

* cited by examiner

*Primary Examiner* — Amy Sterling
(74) *Attorney, Agent, or Firm* — Alberto A. Leon; ALeonlaw, P.C.

(57) ABSTRACT

The invention comprises a transmission line hanger insert that acts as an adapter that allows standard transmission line adapters previously used for coaxial cables to be used for fiber optic cables, power cables, hybrid cables and other cables that are becoming the new standard in the telecommunications industry. The insert is manufactured from UV-resistant rubber that is softer than the rubber used in prior art inserts.

Figure 1:
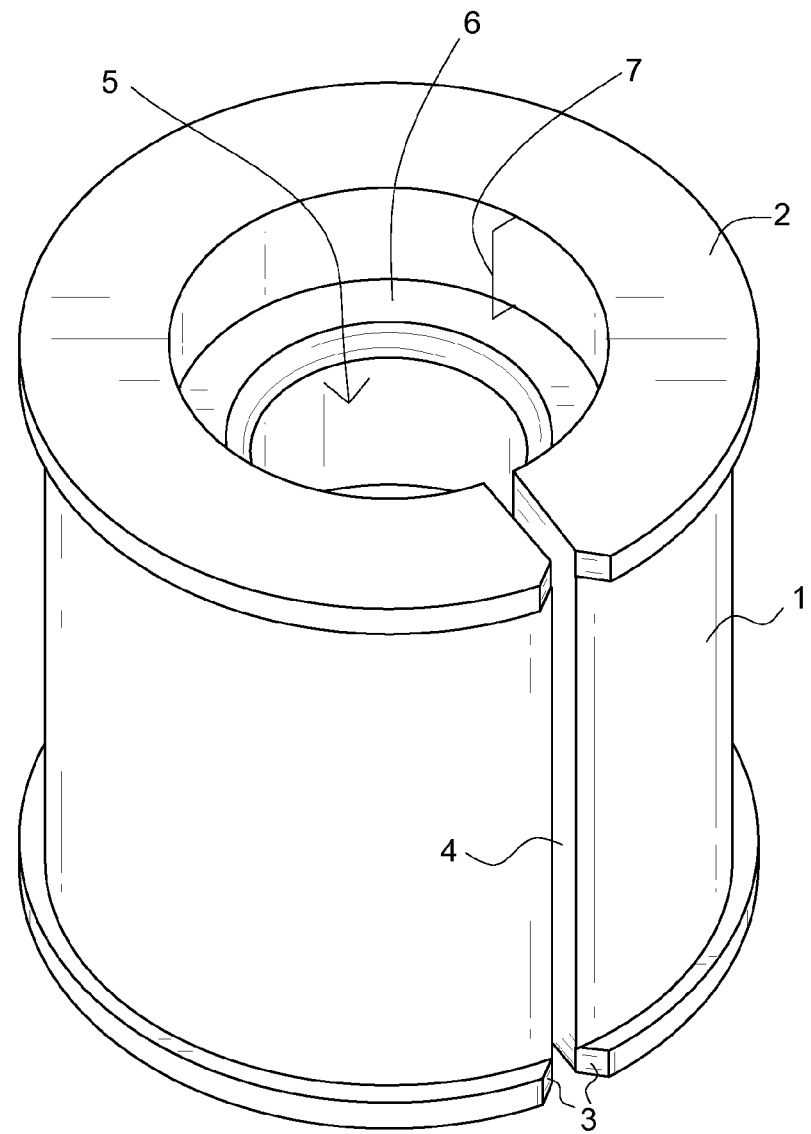

The insert of the present invention comprises a hollow cylindrical

The present invention is a hollow, spool-shaped cylindrical insert for a standard transmission line hanger that comprises a cylinder with a rim at either end, a round opening through the cylinder's center, a slit extending from the exterior of the insert to the interior opening and multiple standing ribs in the interior of the insert that allow the insert to be used with a plurality of different cable diameters and shapes.

2 Claims, 6 Drawing Sheets

ADAPTABLE CABLE HANGER INSERT

CROSS-REFERENCE TO RELATED APPLICATIONS

Non-applicable

STATEMENT REGARDING FEDERALLY SPONSORED RESEARCH AND DEVELOPMENT

Non-applicable

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

1. Field of the Invention

The present invention generally relates to an adaptive rubber insert that allows standard coaxial cable support products to be used to support fiber optic cable, power cable and hybrid cables.

2. Description of the Related Art Including Information Disclosed Under 37 CFR 1.97 and 37 CFR 1.98

The following description of the art related to the present invention refers to a number of publications and references. Discussion of such publications herein is given to provide a more complete background of the principles related to the present invention and is not to be construed as an admission that such publications are necessarily prior art for patentability determination purposes.

For many years, coaxial cable was the standard type of cable used in the telecommunications industry to transmit a signal from a radio located on the ground to an antenna located on an elevated support structure. Due to advances in technology, the use of coaxial cable to transmit signals has become less common. The use of fiber optic cable to transmit the signal from the radio to the antenna has become the industry standard.

In addition to the coaxial or fiber optic cables, antennas often require a source of electrical power, which requires running a power cable from the power source on the ground up to the antennae on the support structure. In some cases, hybrid cables that carry both fiber optic and power cables are used to consolidate the number of cables required for a functioning antenna assembly. Whether or not hybrid cables are used, a multiplicity of cables run from the ground to the antenna at a base station.

Transmission line hangers are the preferred devices used for supporting coaxial cable and other types of cable in the telecommunications industry. They provide a means of securing the cable to a support structure. Hangers are typically made of metal or plastic. The hangers have been designed to support the common sizes of cable used in the telecommunications industry. Cable sizes include but are not limited to ⅜", ½", ⅞", 1¼", 1⅝" and 2¼" diameter cables. Typically, a different size of hanger is required for each size of cable. Hangers that have been designed to support coaxial cable are often not compatible with fiber optic cable, power cables or hybrid cables.

In order to limit the cost of retrofitting base stations with fiber optic cable, rubber hanger inserts or barrel cushions have been adapted to allow pre-existing hanger designs to be used for cables with different cross-sectional shapes and diameters. The hanger insert can be used without completely redesigning the traditional hangers used to support coaxial cable.

Hanger inserts are typically manufactured from UV-resistant EPDM (ethylene propylene diene monomer) rubber. Durometer is the international standard for hardness of rubber, and is measured on three different Shore Hardness Scales. Soft rubbers, including EPDM rubbers, are generally measured on the Shore A Scale. The standard hardness of prior art inserts is typically in the range of Shore 55A-60A, which is equivalent to tire rubber.

The commercially available inserts of the prior art are cylindrical and have a round, smooth hole through the center of the cylinder that envelops the cable when assembled. The inserts have an outer diameter that is matched to the size of the hanger, and an inner diameter that is particular to a specific diameter, cross-sectional shape, and type of cable. Some inserts are designed to support multiple small diameter cables, each in its individual opening. Inserts also have a lengthwise slit or other opening through which the cable can pass at the time of installation.

In order to assemble a standard line hanger with an insert, the insert is opened along the lengthwise slit, the cable is inserted through the slit into the opening in the center of the insert, and the insert is placed into the metal portion of the hanger. The hanger is then secured to the support structure of the antenna. Once the hanger is fully assembled, the hanger exerts pressure over the insert that hold it shut and immobile inside the hanger, resulting in a secure suspension system for the cable.

BRIEF SUMMARY OF THE INVENTION

Objects, advantages and novel features, and further scope of applicability of the present invention will be set forth in part in the detailed description to follow, taken in conjunction with the accompanying drawings. The objects, advantages and novel features, and further scope of applicability of the present invention will become apparent to those skilled in the art upon examination of the following, or may be learned by practice of the invention. The objects and advantages of the invention may be realized and attained by means of the instrumentalities and combinations particularly pointed out in the appended claims.

The present application discloses and claims a hanger insert adapter designed to support a range of cable diameters while being compatible with standard cable support products used in the telecommunications industry.

It is an object of the present invention to provide a single interface which allows hangers designed to suspend coaxial cable to be used to support fiber optic cable, power cable, hybrid cable and other types of cable of varying diameters and cross-sectional shapes that are becoming common in the telecommunications industry.

It is an object of the present invention to allow transmission line hangers designed to support cable with a specific outside diameter the ability to support a range of cable diameters and the ability to support multiple cables as an alternative to replacement of the entire line hanger/insert arrangement. Because it can be used with a range of cable sizes and shapes, the insert acts as an adapter for standard transmission line hangers to be used with different types of cable.

It is a further object of the present invention to provide a transmission line hanger insert that absorbs additional vibration and provides more support for a cable than prior art inserts.

BRIEF DESCRIPTION OF THE SEVERAL VIEW OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention.

FIG. 1: is a perspective view of the insert of the present invention.

Figure 2:
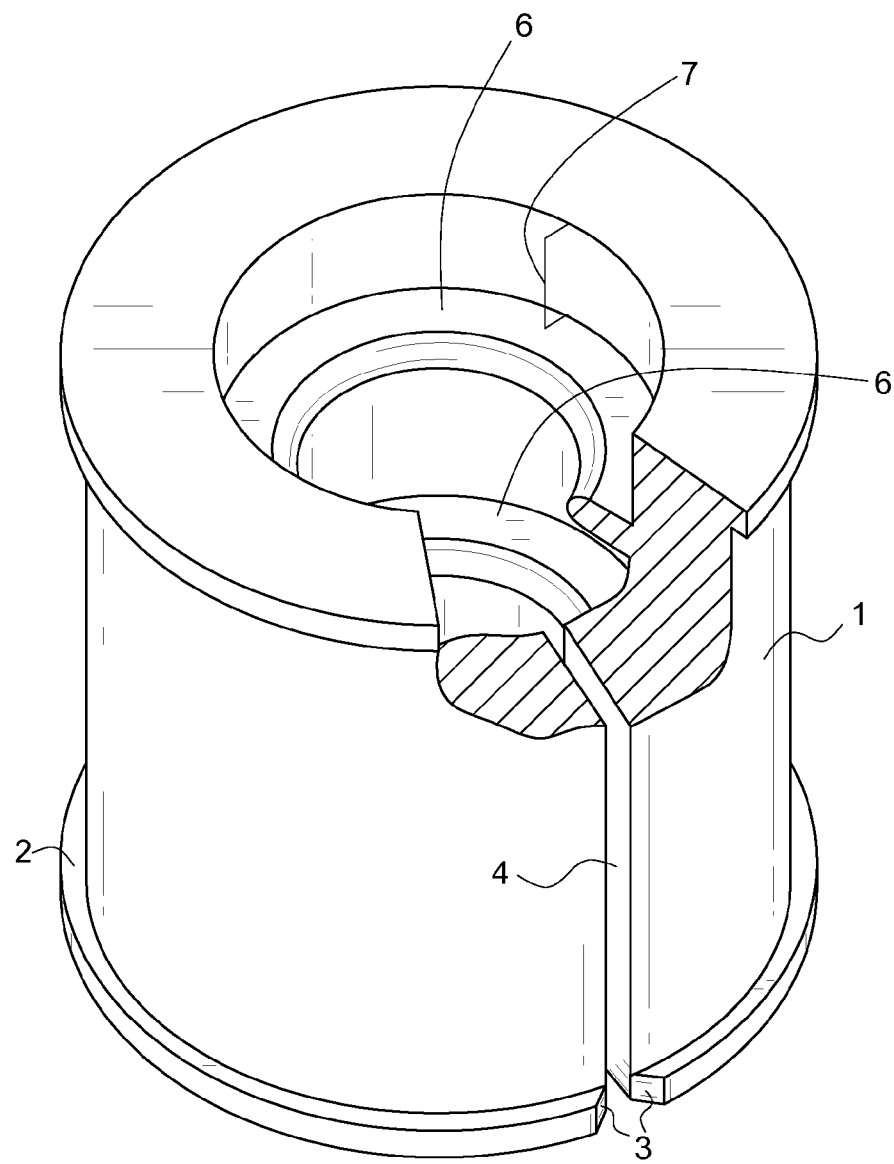

FIG. 2: is a cutout view of FIG. 1.

Figure 3:
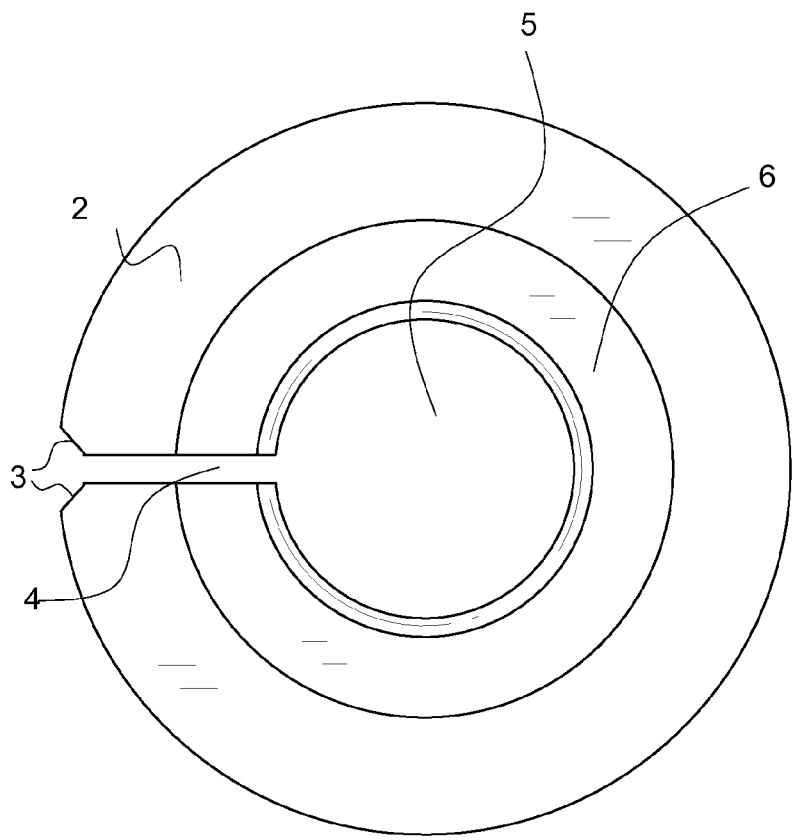

FIG. 3: is an elevational view of the end of the insert of the present invention.

Figure 4:
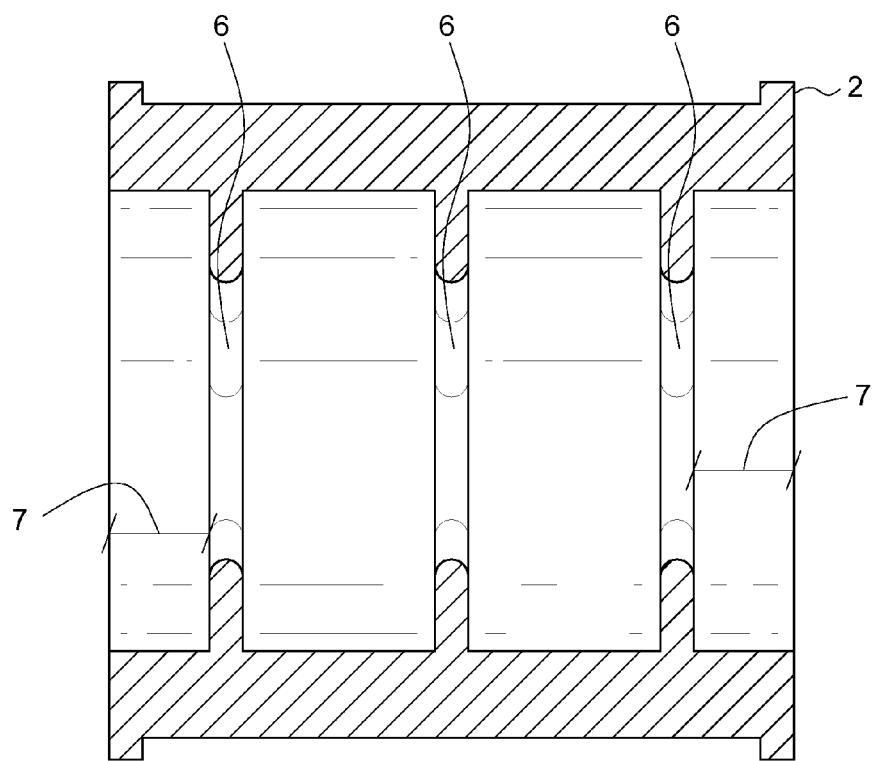

FIG. 4: is an elevational view of a lateral cross-section of the insert of the present invention.

Figure 5:
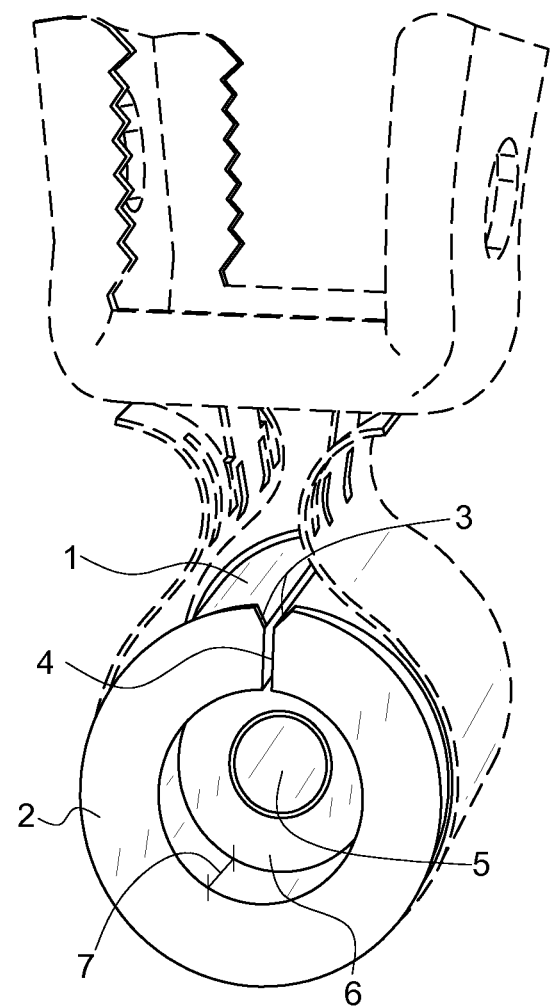

FIG. 5: is a perspective side view of the insert of the present invention inside a prior art line hanger.

Figure 6:
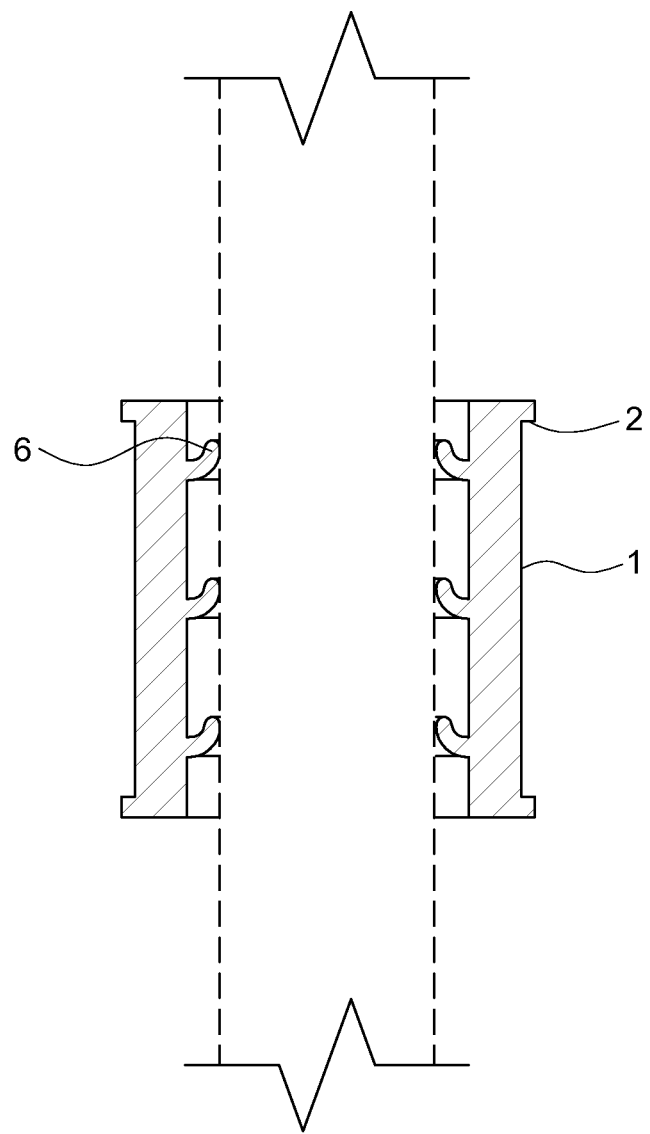

FIG. 6: is a cross-sectional view of the insert of the present invention when installed on a large diameter cable.

DETAILED DESCRIPTION OF THE INVENTION

The insert of the present invention is a spool-shaped cylindrical piece of UV-resistant molded rubber that comprises a cylindrical tube (1) with a rim (2) at either end, a round opening (5) through the cylinder's center, a slit (4) extending from the exterior of the insert to the interior opening (5) and a number of standing ribs (6) around the circumference of the interior of the insert. The insert is manufactured from a softer rubber than prior art inserts. In the preferred embodiment, the rubber durometer for the present invention is Shore 50A.

The exterior of the insert, as depicted in FIG. 1, is similar to the standard inserts known in the art, which allows the insert to be utilized in the same hangers as any other insert. The outside diameter of the insert is compatible with and slightly smaller than the diameter of a standard transmission line hanger, as depicted in FIG. 5. This allows the inserts to be used with common sizes of coaxial cable support hangers. As there are a few different sizes of line hangers, the alternative embodiments of the invention comprise different exterior diameters to fit each common size of line hanger.

The exterior of the insert is cylindrical and is sized to fit snugly within a transmission line hanger. The hanger inserts includes a lip or rim (2) on either end of the insert which prevents the insert from shifting or dislodging once placed into the hanger. The lip is simply the thin terminal end of the line hanger tube, which has a larger diameter than the rest of the cylinder, similar to a spool. In the preferred embodiment, the rim is chamfered (3) at the slit (4), creating a notch that allows the insert to be opened more easily for insertion of the cable.

The center of the cylindrical tube (1) is hollow, which means there is an opening through which the cable extends in the center of the insert. A slit (4) along the length of the cylinder allows a cable to be slipped into the opening (5) in the center of the insert. The round opening (5) in the center of the insert is a large diameter with a number of "standing ribs" (6) which project into the interior of the insert. The standing ribs (6) extend around the entire inner circumference of the insert, and the slit (4) extends through the standing ribs (6).

The interior ribs (6) are designed to compress or collapse around the cable(s) when a larger size cable is placed into the insert or if multiple cables are placed into the insert, as depicted in FIG. 6. The ribs (6) are narrow enough to allow for compression towards the inner surface of the insert. In the preferred embodiment, the ribs are 0.10 inches thick. In the preferred embodiment, the insert is manufactured from a softer rubber than the prior art inserts to allow this compression to take place more easily. The softness of the rubber, combined with the width of the rib results in a compressable rib that fulfills the objects of the invention. The ribs, when compressed against the cable absorb vibration and provide support for the cable. In addition, the softness of the rubber allows it to support bundles of cables that do not have a symmetrical cross-section. The height of the ribs varies with the size of the insert and the size of hanger for which the insert is designed. In the preferred embodiments, the height of the ribs varies from 0.19 inches to 0.30 inches. The preferred embodiment comprises three ribs of equal height and width spaced 0.675 inches apart.

When viewed from the side, as depicted in FIG. 3, each end of the insert comprises the rim (2), a recess (7), and a center opening (5). The recess (7) is formed by the large diameter of the opening (5) through the center of the insert and the outermost standing rib (6). The rib forms a circular shelf when the insert is fully closed, as can be seen in FIG. 3. The width of the shelf is the height of the standing rib. The recess (7) has a center hole through which the cable will protrude when the line hanger is assembled and installed. Due to compression of the ribs, the center hole will change in diameter and shape to meet the diameter and shape of the cable(s) used in the insert. In the preferred embodiment, the depth of the recess, which is equivalent to the distance from the rim to the first standing rib, is 0.30 inches.

What is claimed is:

1. A line hanger insert capable of supporting a wide range of cable diameters while being compatible with commercially available line hangers, the insert comprising a spool-shaped, partly-hollow cylindrical rubber tube, the tube comprising: a body, two ends and an open center, each end terminating in a raised rim, an exterior surface and an interior surface, a slit extending vertically from one end of the body to the other, and from the exterior surface of body to the interior surface, multiple standing ribs extending horizontally and around the circumference of the interior surface, the standing ribs capable of forming a recess between the rim and the most distal standing rib on each end, the standing ribs being capable of flexing when pressure is applied so they are capable of giving way to accommodate a cable or cables the insert is supporting upon the insert receiving pressure from a line hanger, wherein the rim is chamfered towards the slit on either side of the slit.

2. A line hanger insert capable of supporting a wide range of cable diameters while being compatible with commercially available line hangers, the insert comprising a spool-shaped, partly hollow cylindrical rubber tube of UV-resistant rubber with Auxometer of Shore 50A, the tube comprising:
   a. a body, two ends and an open center, the ends terminating in a raised rim;
   b. an exterior surface and an interior surface;
   c. a slit extending vertically from one end to the other and from the exterior surface to the interior surface, the raised rim being chamfered towards the slit on either side of the slit;
   d. three standing ribs 0.10 inches to 0.30 inches wide, spaced 0.675 inches apart, the ribs extending horizontally and around the circumference of the interior surface capable of forming a 0.30 inch recess between the rim and the most distal standing rib on each end, the standing ribs being capable of flexing when pressure is applied so they are capable of giving way to accommodate a cable or cables the insert is supporting upon the insert receiving pressure from a line hanger.

* * * * *